July 6, 1965

C. HILL 3,193,302

REAR SUSPENSION MECHANISM FOR MOTOR VEHICLES

Filed April 12, 1963

INVENTOR
CLAUDE HILL

BY
Mason, Fenwick & Lawrence
ATTORNEYS

July 6, 1965 C. HILL 3,193,302
REAR SUSPENSION MECHANISM FOR MOTOR VEHICLES
Filed April 12, 1963 4 Sheets-Sheet 2

INVENTOR
CLAUDE HILL
BY
Mason, Fenwick & Lawrence
ATTORNEYS

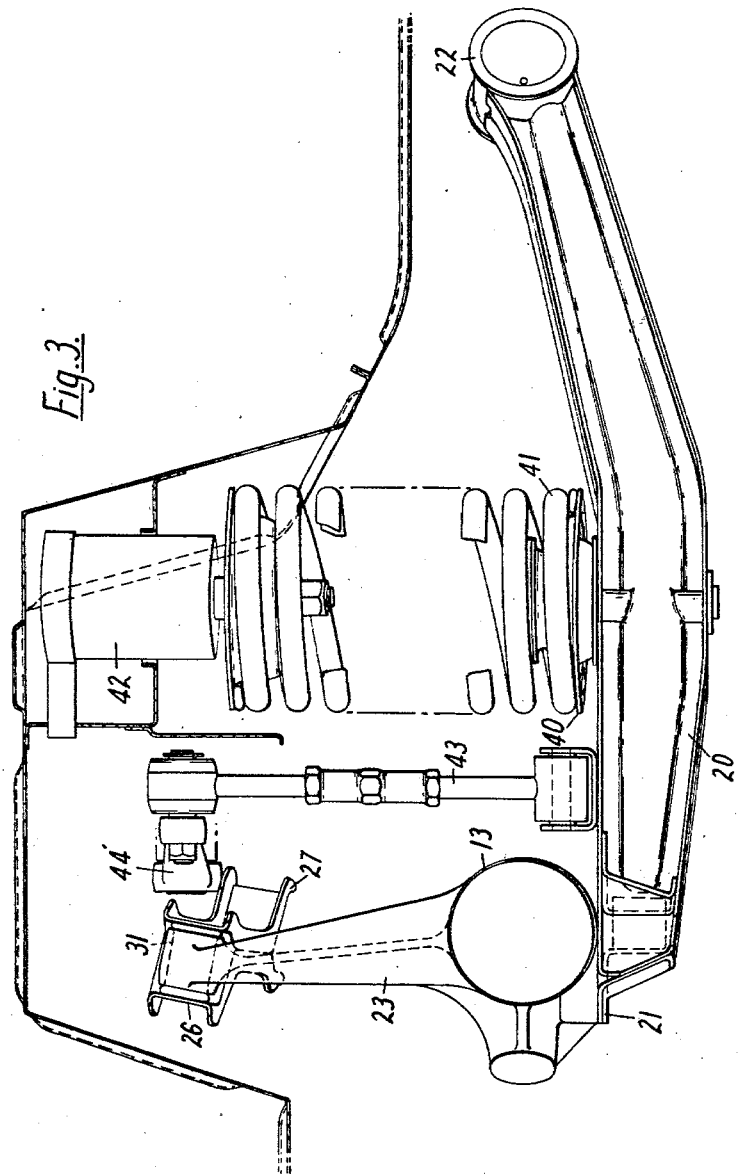

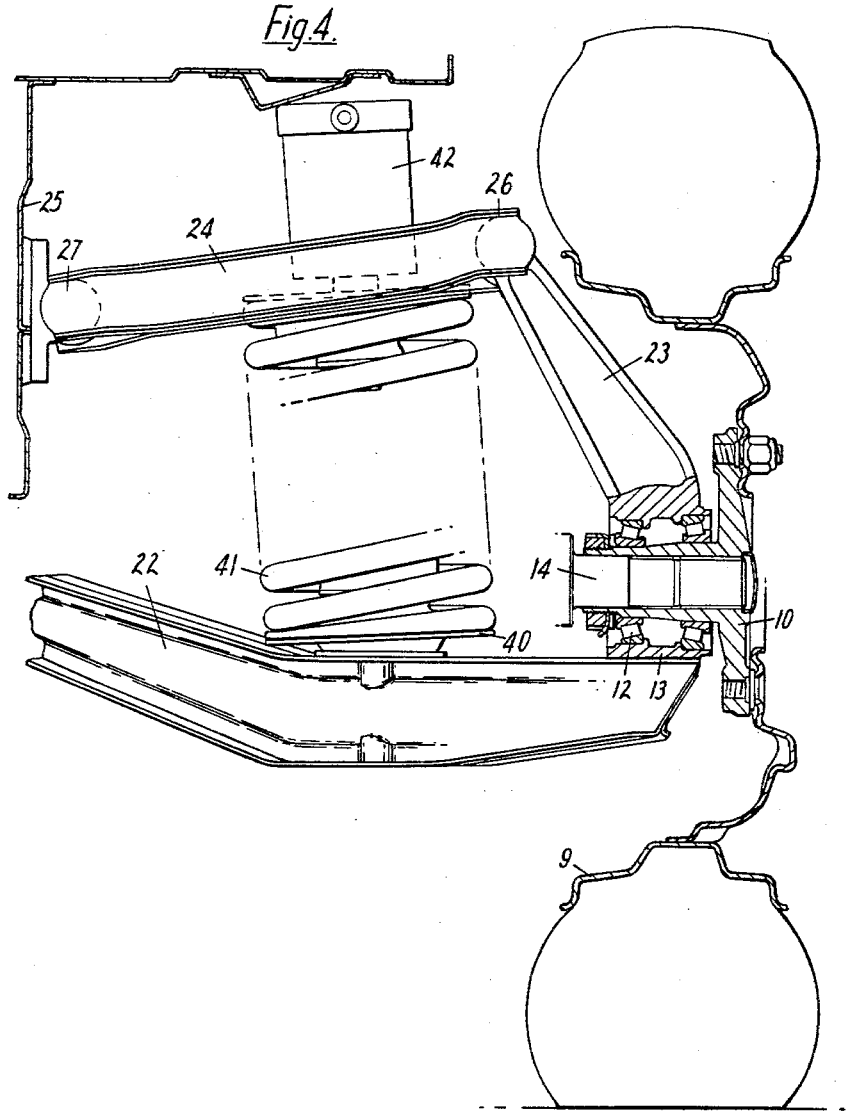

United States Patent Office 3,193,302
Patented July 6, 1965

3,193,302
REAR SUSPENSION MECHANISM FOR MOTOR VEHICLES
Claude Hill, Kenilworth, Warwickshire, England, assignor to Harry Ferguson Research Limited, Stow-on-the-Wold, Gloucestershire, England, a British company
Filed Apr. 12, 1963, Ser. No. 272,614
Claims priority, application Great Britain, Apr. 18, 1962, 14,930/62
20 Claims. (Cl. 280—124)

This invention relates to rear wheel suspension mechanisms for vehicles.

It is an object of the invention to provide a rear wheel suspension mechanism which will hold the associated rear road wheel at a proper attitude to the road throughout the range of vertical swing of the mechanism and which in addition is of light construction so as to minimize the unsprung masses of the vehicle.

The invention provides a rear wheel suspension mechanism in a vehicle, the mechanism including a straight arm inclined inwards and forwards from the vehicle wheel hub and rigidly connected thereto, and a pivotal connection between said arm and a point on the chassis frame of the vehicle at substantially the same level as the "normal position" of the road wheel centre, the axis of said physical connection extending at substantially right angles to said arm.

The invention also provides a rear wheel suspension mechanism in a vehicle, the mechanism including an arm inclined inwards and forwards from the vehicle wheel hub and rigidly connected thereto, the arm being pivotally connected to a point on the chassis frame of the vehicle at substantially the same level as the "normal position" of the road wheel centre, and a stabilizing member pivotally connected between a point on the wheel hub and a point on the chassis frame rearwardly of the road wheel centre and of the point of connection to the wheel hub.

The invention also provides a rear wheel suspension mechanism in a vehicle, the mechanism including an arm inclined inwards and forwards from the vehicle wheel hub and rigidly connected thereto, a pivotal connection between said arm and a point on the chassis frame of the vehicle at substantially the same level as the "normal position" of the road wheel centre, and a stabilizing member pivotally connected between a point on the wheel hub and a point on the chassis frame rearwardly of the road wheel centre and of the point of connection to the wheel hub, the point of pivotal connection of said arm to the chassis frame, the point of pivotal connection of said stabilizing member to the chassis frame, and the "normal position" of the road wheel centre, all lying in substantially the same horizontal plane.

Preferably the points of pivotal association include bushes of resilient material which permit relative up and down movement of the jointed parts together with a limited amount of fore and aft movement.

An embodiment of the invention will now be described by way of example with reference to the accompanying drawings in which:

FIG. 3 is a side view of the suspension mechanism; and

FIG. 4 is a section on the line IV—IV of FIG. 2.

Figure 1:
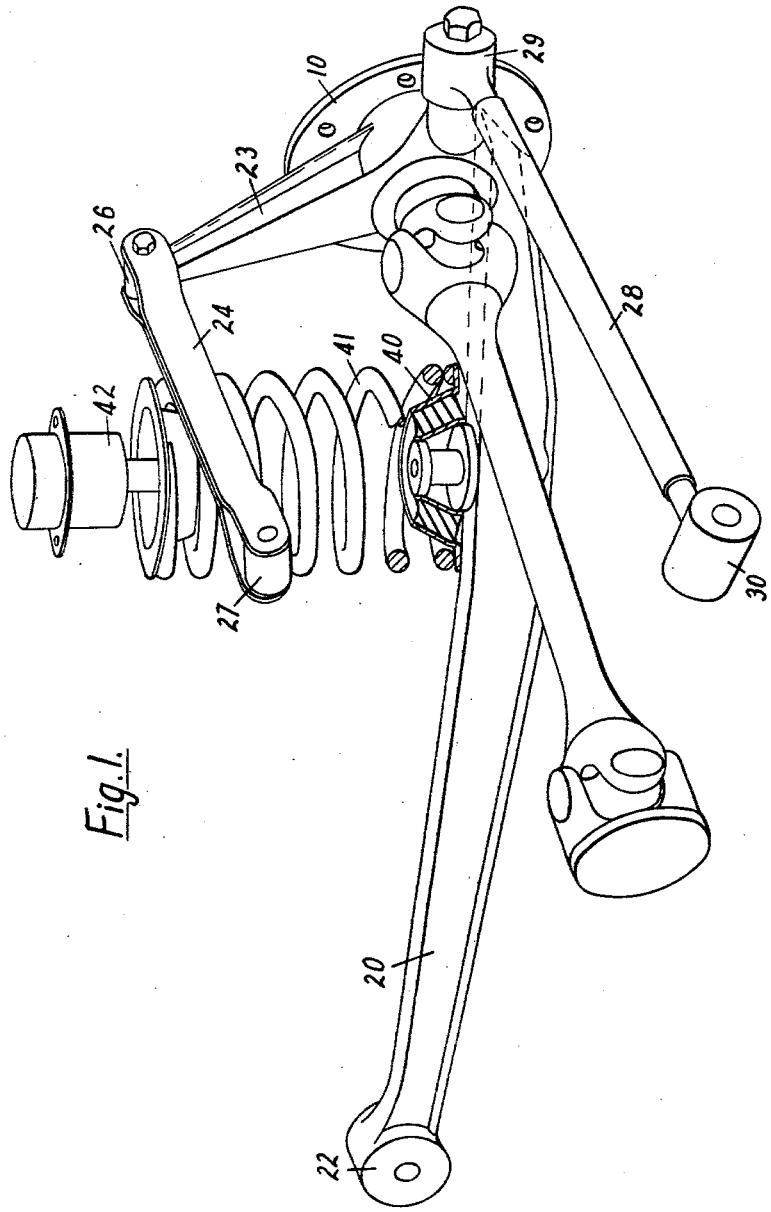
FIG. 1 is a perspective view of a right-hand rear wheel suspension mechanism mounted on a vehicle chassis.
Figure 2:
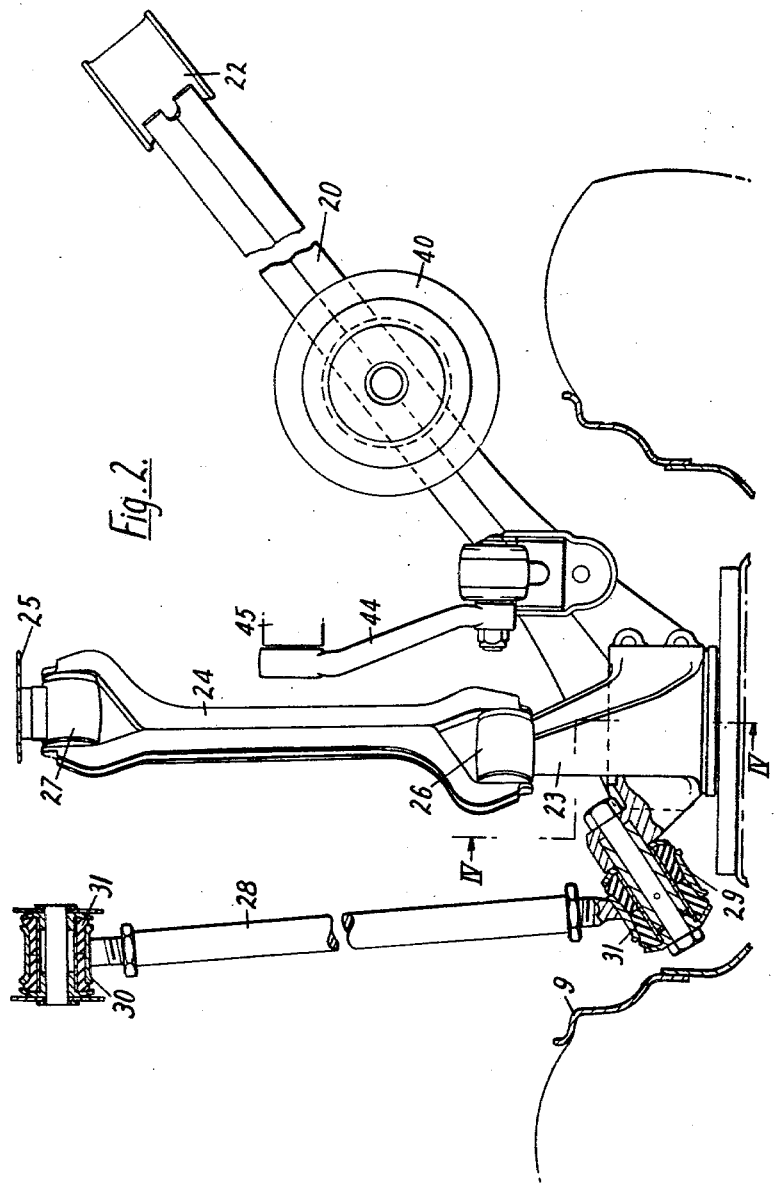
FIG. 2 is a plan view of the suspension mechanism certain parts being shown in section.

Referring to the drawings the right-hand rear road wheel of the vehicle, looking towards the front, is indicated by 9 (FIGS. 2 and 4). The boss 10 of the wheel 9 is journalled in roller bearings 12 in a hub 13. A conventional engine-driven half-shaft 14 is secured to the boss 10 and extends inwards where it is jointed to an output shaft of a differential gear (not shown) on the chassis frame.

The suspension mechanism includes an arm 20 which is rigidly bolted at 21 to the underside of the hub 13. The arm 20 extends forwards and inwards and has a pivotal joint 22 with the chassis frame. The axis of the joint 22 is at right angles to the arm 20; that is, the axis is directed forwards and outwards, towards the right hand side of the chassis frame as viewed from the rear, and it is at the level of the road wheel centre in the normal position of the wheel relatively to the chassis frame. The expression "normal position" of the wheel is used herein and in the claims to mean the position in which the wheel lies relative to the chassis frame when the vehicle is travelling with uniform velocity over a level surface and is carrying an average load.

The suspension mechanism also includes an arm 23 which is directed upwards and slightly inwards, and the top end of which is connected by a top link 24 to a part 25 of the chassis frame. The link 24 is directed inwards and slightly downwards. Its joints with the arm 23 and frame part 25 are indicated by 26 and 27 respectively.

The suspension mechanism also includes a bottom link 28 which is respectively jointed at 29 and 30 to the hub 13 and a bracket on the chassis frame. This bottom link extends inwards from the hub.

It is to be noted that the above-described suspension mechanism includes only five pivotal joints, namely the joints 22, 26, 27, 29 and 30 all arranged to allow pivotal movement about substantially horizontal axes.

In order to permit not only the normal up-and-down pivotal motion of the parts jointed by these joints, but also some measure of universal motion which allows for minor variously directed relative motions and inaccuracies in the manufacture and positioning of the suspension mechanism, each of the joints incorporates a cylindrical bush 31 composed of rubber or equivalent elastic material. Each bush allows full up-and-down motion about the normal axis of pivot, but by virtue of its resilience permits tilting of the axis of pivot to a slight degree in any direction.

The arm 20 is arranged mainly for the purpose of withstanding fore-and-aft forces applied in the horizontal plane of the rear road wheel centres, especially those forces created by deceleration of the vehicle during heavy braking. The arrangement of the arm 20 approximately in said plane at an acute forward and inward inclination from the hub 13 is advantageous to the purpose stated. Moreover substantial rigidity is derived from the bush 31 of the joint 22, which permits the arm to swing up and down with comparative freedom but allows only slight fore-and-aft swinging. The arm is assisted in its main purpose by the approximately co-planar bottom link 28, which is permitted by its joints 29, 30 to swing up and down with comparative freedom, but is capable of only slight fore-and-aft swinging by virtue of the construction of the bushes 31.

The top link 24 co-operates with the arm 20 to maintain the plane of the road wheel in the proper attitude relative to the road, i.e., substantially at right angles to the road. This link 24 also is comparatively free to swing up and down, about the axes of its joints 26, 27 but is capable of only slight fore-and-aft motion by virtue of the construction of the bushes 31.

The arm 20, supports the weight of the sprung masses of the vehicle, and is provided with a seat 40 for a compression spring 41 upon which bears a fitting 42 on the chassis frame. The arm 20 is also connected by a link 43 to the arm 44 of a shock absorber 45 of any appropriate construction and action. The fitting 42 automatically adjusts the height of the vehicle and contains a hydraulic ram actuated by oil pressure produced by pumping action in the shock absorber 45.

By virtue of the invention there is provided a suspension mechanism in which up and down relative motion between the road wheel and the chassis frame is permitted while maintaining the correct attitude of the road wheel relative to the road, together with fore-and-aft motion which is permitted only to a slight extent and is resiliently resisted and cushioned. In effect some measure of universal motion is permitted in the main pivotal joints of the mechanism.

I claim:

1. A rear wheel suspension mechanism in a vehicle, the mechanism including a straight arm inclined inwards and forwards from the vehicle wheel hub and rigidly connected thereto, a pivotal connection between said arm and a point on the chassis frame of the vehicle at substantially the same level as the "normal position" of the road wheel centre, the axis of said pivotal connection extending at substantially right angles to said arm and a stabilizing member pivotally connected between a point on the wheel hub and a point on the chassis frame rearwardly of the road wheel centre and of the point of connection to the wheel hub.

2. A rear wheel suspension mechanism according to claim 1 including a substantially horizontally disposed upper member pivotally connected to an extension of the wheel hub and pivotally connected to a point on the chassis frame of the vehicle.

3. A rear wheel suspension mechanism according to claim 1 in which said pivotal connections includes bushings of resilient material to permit relative up and down movement of the jointed parts together with a limited amount of fore and aft movement.

4. A rear suspension mechanism according to claim 1 in which said stabilizing member lies in substantially the same horizontal plane as said arm.

5. A rear wheel suspension mechanism in a vehicle, the mechanism including an arm inclined inwards and forwards from the vehicle wheel hub and rigidly connected thereto, the arm being pivotally connected to a point on the chassis frame of the vehicle at substantially the same level as the "normal position" of the road wheel centre, and a stabilizing member pivotally connected between a point on the wheel hub and a point on the chassis frame rearwardly of the road wheel centre and of the point of connection to the wheel hub.

6. A rear wheel suspension mechanism according to claim 5 including a substantially horizontally disposed upper member pivotally connected to a point on the chassis frame of the vehicle.

7. A rear wheel suspension mechanism according to claim 5 in which said stabilizing member lies in substantially the same horizontal plane as said arm.

8. A rear wheel suspension mechanism according to claim 5 in which the points of pivotal connection include bushes of resilient material to permit relative up and down movement of the jointed parts together with a limited amount of fore and aft movement.

9. A rear wheel suspension mechanism in a vehicle, the mechanism including an arm inclined inwards and forwards from the vehicle wheel hub and rigidly connected thereto, the arm being pivotally connected to a point on the chassis frame of the vehicle, and a stabilizing member pivotally connected between a point on the wheel hub and a point on the chassis frame rearwardly of the road wheel centre and of the point of connection to the wheel hub, said stabilizing member lying in substantially the same horizontal plane as said arm.

10. A rear wheel suspension mechanism according to claim 9 including a substantially horizontally disposed upper member pivotally connected to an extension of the wheel hub and pivotally connected to a point on the chassis frame of the vehicle.

11. A rear wheel suspension mechanism according to claim 9 in which said points of pivotal connection include bushes of resilient material to permit relative up and down movement of the jointed parts together with a limited amount of fore and aft movement.

12. A rear wheel suspension mechanism according to claim 6 in which said points of pivotal connection include bushes of resilient material to permit relative up and down movement of the jointed parts together with a limited amount of fore and aft movement.

13. A rear wheel suspension mechanism in a vehicle, the mechanism including an arm inclined inwards and forwards from the vehicle wheel hub and rigidly connected thereto, a pivotal connection between said arm and a point on the chassis frame of the vehicle at substantialy the same level as the "normal position" of the road wheel centre, and a stabilizing member pivotally connected between a point on the wheel hub and a point on the chassis frame rearwardly of the road wheel centre and of the point of connection to the wheel hub, the point of pivotal connection of said arm to the chassis frame, the point of pivotal connection of said stabilizing member to the chassis frame, and the "normal position" of the road wheel centre, all lying in substantially the same horizontal plane.

14. A rear wheel suspension mechanism according to claim 13 in which said stabilizing member lies in substantially the same horizontal plane as said arm.

15. A rear wheel suspension mechanism according to claim 13 in which the axis of the pivotal connection between said arm and the chassis frame extends at substantially right angles to said arm.

16. A rear wheel suspension mechanism according to claim 13 in which said points of pivotal connection includes bushes of resilient material to permit relative up and down movement of the jointed parts together with a limited amount of fore and aft movement.

17. A rear wheel suspension mechanism in a vehicle, the mechanism including in combination upper and lower members, an arm inclined inwards and forwards from the vehicle wheel hub, a first universal pivotal joint between said arm and the vehicle chassis frame, said joint being at substantially the same level as the "normal position" of the road wheel centre, and further universal pivotal joints connecting said upper and lower members to the vehicle chassis frame and to the wheel hub, said lower member lying in substantially the same horizontal plane as said arm.

18. A rear wheel suspension mechanism according to claim 17 in which the axis of said first pivotal joint extends at substantially right angles to said arm.

19. A rear wheel suspension mechanism according to claim 17 in which said universal pivotal joints include bushes of resilient material.

20. A rear wheel suspension mechanism in a vehicle, the mechanism including an arm inclined inwards and forwards from the vehicle wheel hub and rigidly connected thereto, a pivotal connection between said arm and a point on the chassis frame of the vehicle at substantially the same level as the "normal position" of the road wheel centre, the axis of said pivotal connection extending at substantialy right angles to said arm, a stabilizing member pivotally connected between a point on the wheel hub and a point on the chassis frame rearwardly of the road wheel centre and of the point of connection to the wheel hub, and a substantially horizontally disposed upper member pivotally connected to an extension of the wheel hub and pivotally connected to a point on the chassis frame of the vehicle, the pivotal connections including bushes of resilient material.

References Cited by the Examiner

UNITED STATES PATENTS

| | | | |
|---|---|---|---|
| 2,052,064 | 8/36 | Whisenand | 180—73 X |
| 2,162,828 | 6/39 | Slack | 280—124 X |
| 2,475,487 | 7/49 | Ennis | 180—73 |
| 2,732,903 | 1/56 | Chayne | 180—73 |
| 2,833,366 | 5/58 | Olley | 180—73 |
| 2,911,052 | 11/59 | Olley | 180—73 |
| 2,988,161 | 6/61 | Herr | 180—73 |
| 3,002,580 | 10/61 | Mueller | 180—73 |

A. HARRY LEVY, *Primary Examiner.*

LEO FRIAGLIA, *Examiner.*